(12) United States Patent
Sestokas

(10) Patent No.: US 7,374,303 B2
(45) Date of Patent: May 20, 2008

(54) OUTER REARVIEW MIRROR AND TILTING ASSEMBLY

(75) Inventor: Affonso Roberto Sestokas, Estado de São Paulo (BR)

(73) Assignee: Metagal Industria E Comercio Ltda., Santa Rita do Supucai - Estado de Minas Gerais (BR)

( * ) Notice: Subject to any disclaimer, the term of this patent is extended or adjusted under 35 U.S.C. 154(b) by 333 days.

(21) Appl. No.: 10/560,058

(22) PCT Filed: Jun. 9, 2004

(86) PCT No.: PCT/BR2004/000088

§ 371 (c)(1),
(2), (4) Date: Dec. 8, 2005

(87) PCT Pub. No.: WO2004/110818

PCT Pub. Date: Dec. 23, 2004

(65) Prior Publication Data

US 2006/0152828 A1    Jul. 13, 2006

(30) Foreign Application Priority Data

Jun. 16, 2003   (BR) .............................. 8300973 U

(51) Int. Cl.
*B60R 1/072* (2006.01)
*G02B 5/08* (2006.01)

(52) U.S. Cl. .................. 359/874; 359/877; 248/487
(58) Field of Classification Search ................ 359/874, 359/877; 248/479, 487
See application file for complete search history.

(56) References Cited

U.S. PATENT DOCUMENTS 4,286,841 A * 9/1981 Deshaw ..................... 359/876
4,341,444 A * 7/1982 Stelma ....................... 359/874
4,449,788 A * 5/1984 Suzuki ....................... 359/873
4,701,037 A * 10/1987 Bramer ...................... 359/874
5,343,333 A * 8/1994 Nagayama et al. ......... 359/874

FOREIGN PATENT DOCUMENTS

| DE | 2461431 | 7/1976 |
|---|---|---|
| DE | 28 40 789 | 4/1980 |
| EP | 0 395 052 A1 | 4/1990 |

\* cited by examiner

*Primary Examiner*—Alessandro Amari
*Assistant Examiner*—Mark Consilvio
(74) *Attorney, Agent, or Firm*—Michael J. Striker

(57) ABSTRACT

The present abstract refers to a patent for utility model covering an actuating mechanism belonging to the field of the components of outer rear-view mirrors, which received the arrangement to provide a better usage and manufacturing conditions, an arrangement being of the type comprising: a pair of electric micro-engines (10) provided with endless axes (11); a pair of annular gears (20) coupled with the respective endless axes; two elastic grips (30) incorporated into the gears; two threaded actuating pins (40), which pass through and remain coupled with the grips; a casing (50)-(60), which houses the engine and gear assembly, and the ends of the actuating pins projecting outwards; a middle articulation assembly (70), whose first portion is incorporated into the body (50) of the casing; a plate (80) for supporting the mirror bracket (1) whose rear face features a pair of grooves (81), with which the ends of the actuating pins (40) are articulately coupled; said supporting plate (80) being further provided with a middle opening (82) and featuring a second portion of the middle articulation assembly (70); said articulation assembly (70) being further formed by a balance beam (71) articulately coupled with the mentioned first and second portions of the articulation assembly (70).

3 Claims, 6 Drawing Sheets

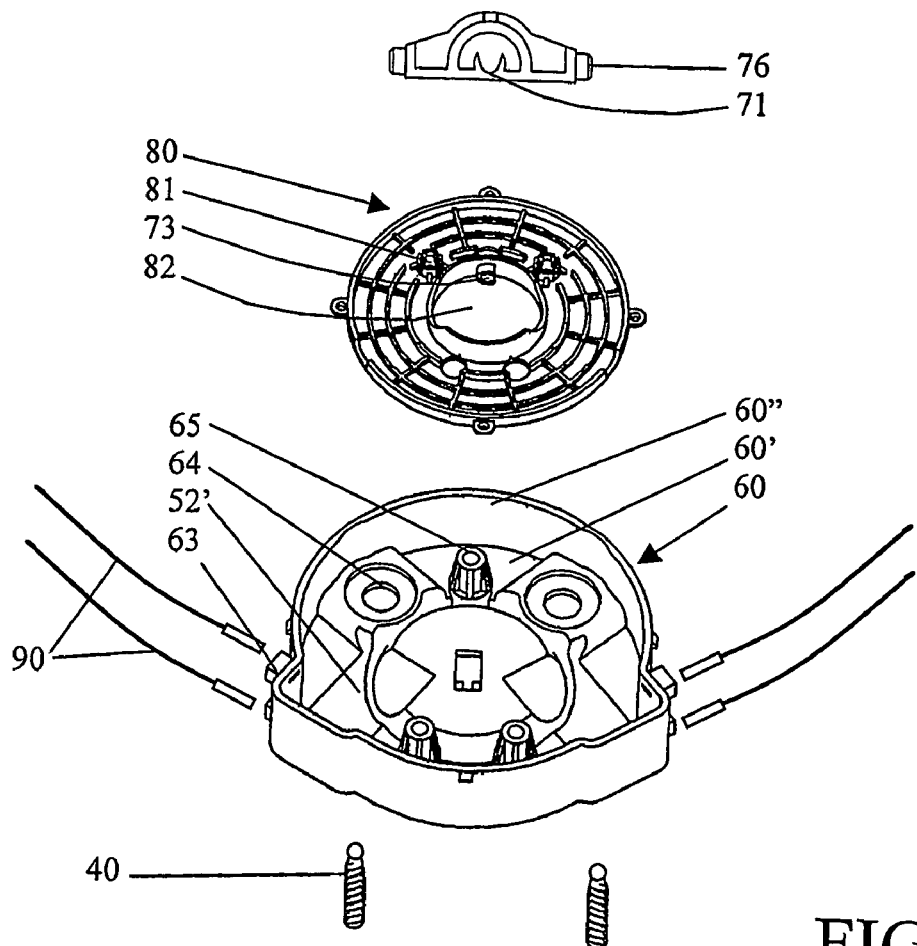
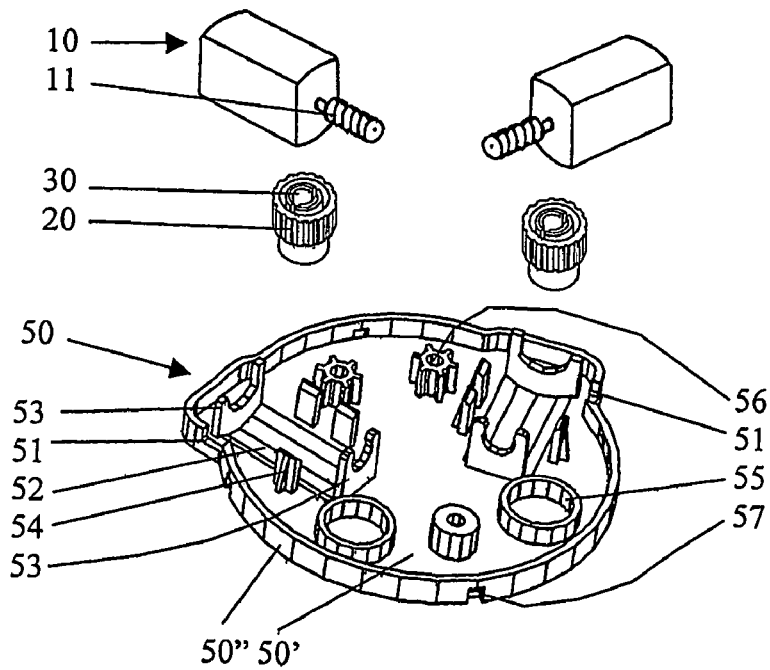
FIG. 1

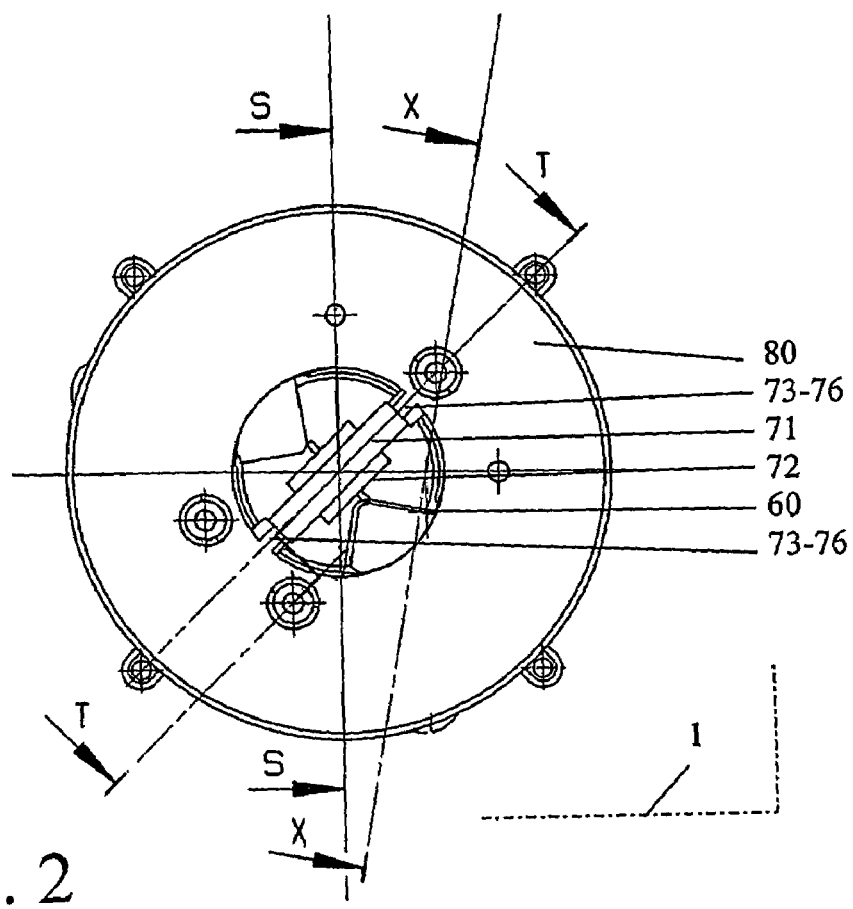
FIG. 2
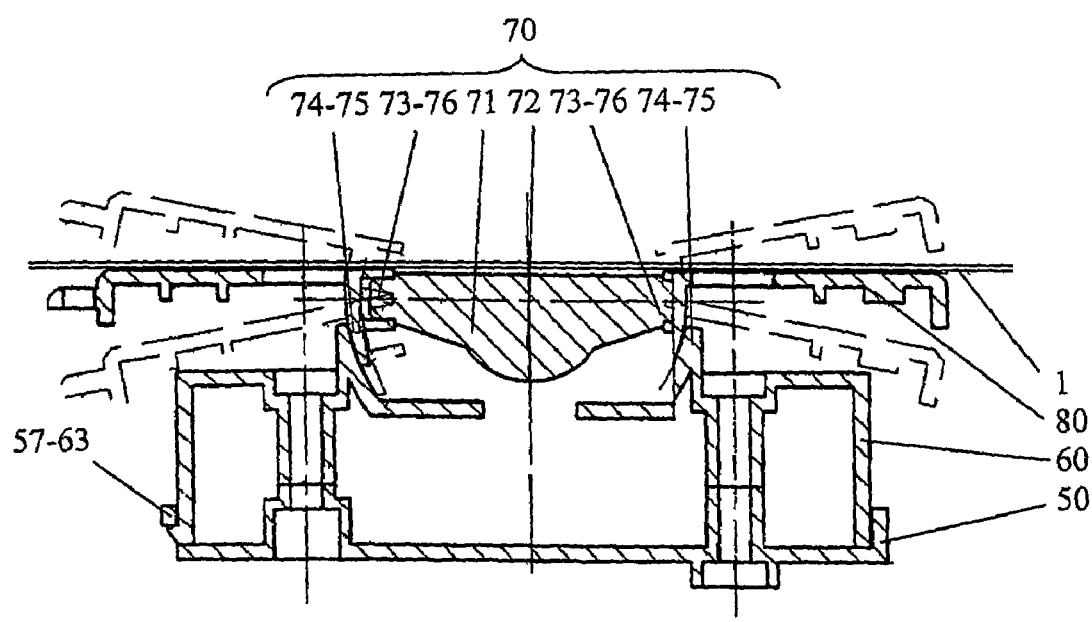
FIG. 5 T-T

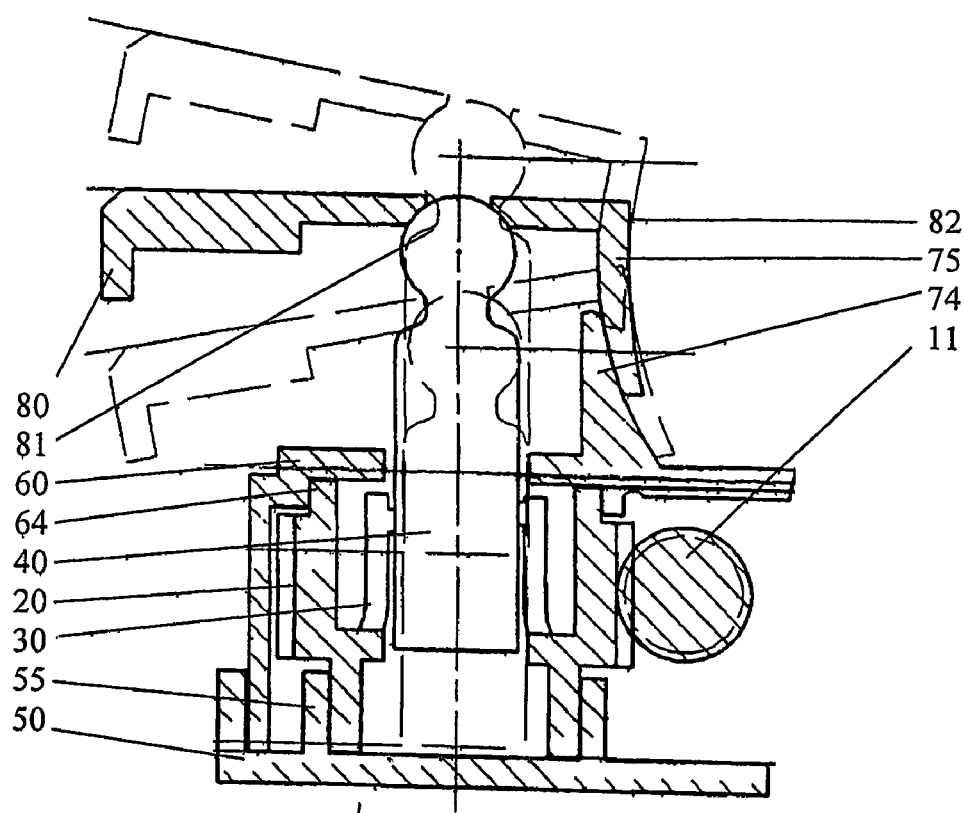
FIG. 4
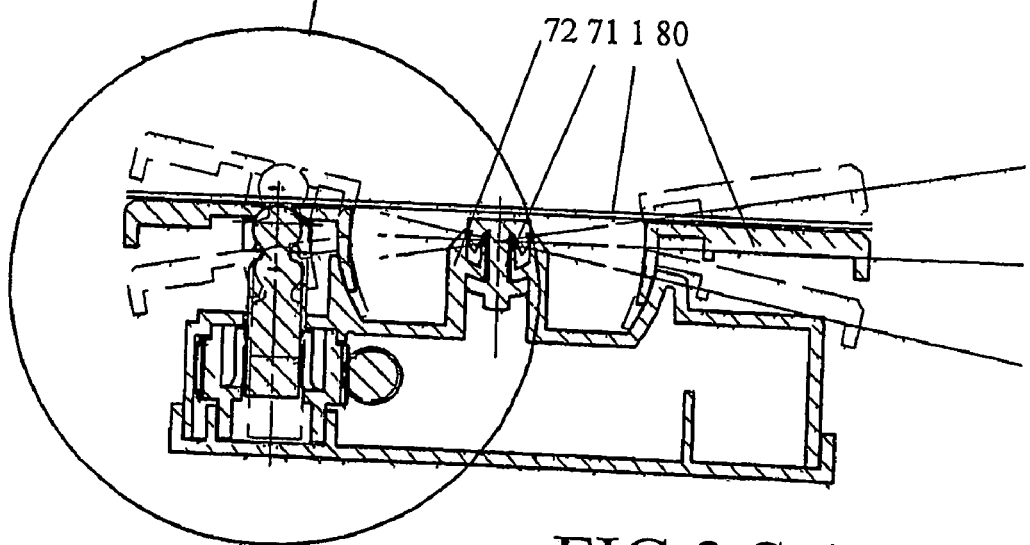
FIG.3 S-S

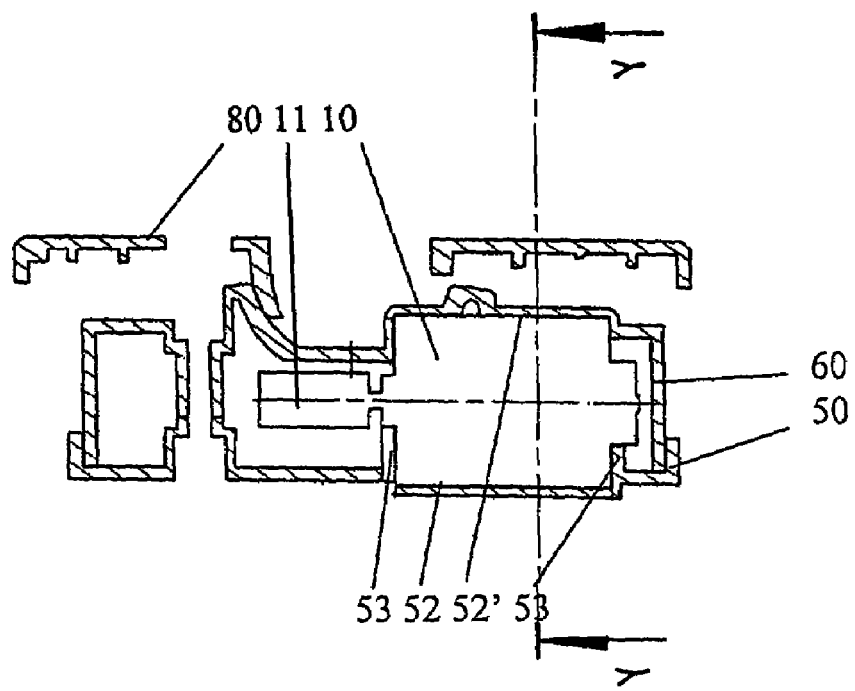
FIG.6 X-X
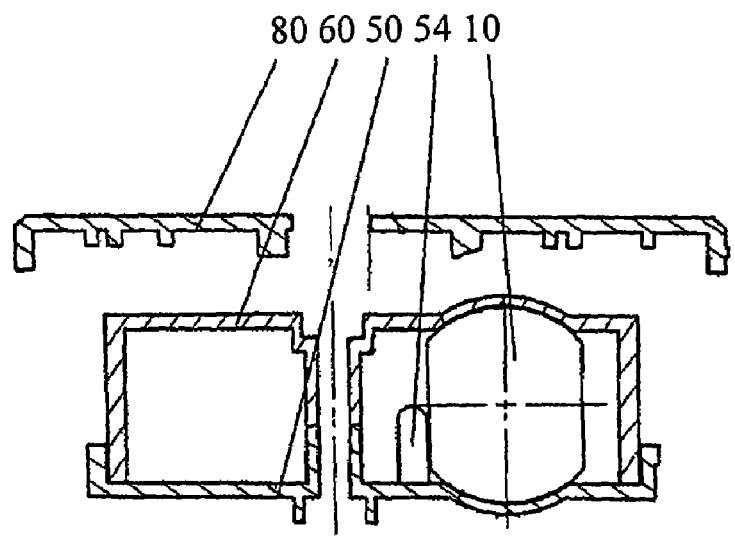
FIG. 7 Y-Y

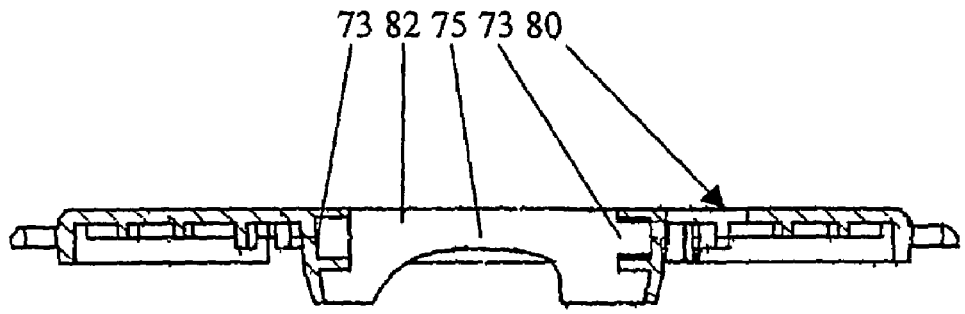
FIG. 10 L-L
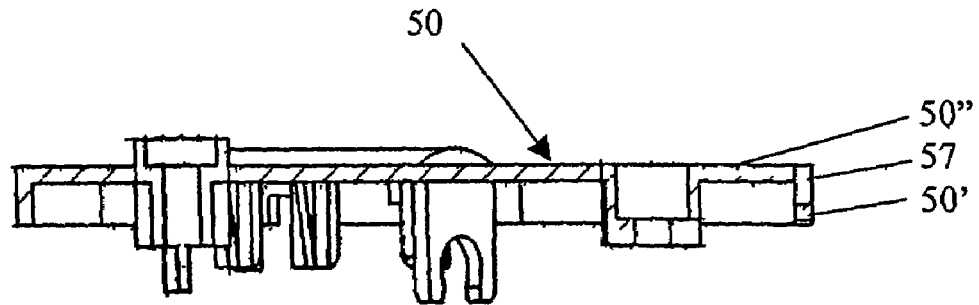
FIG. 11
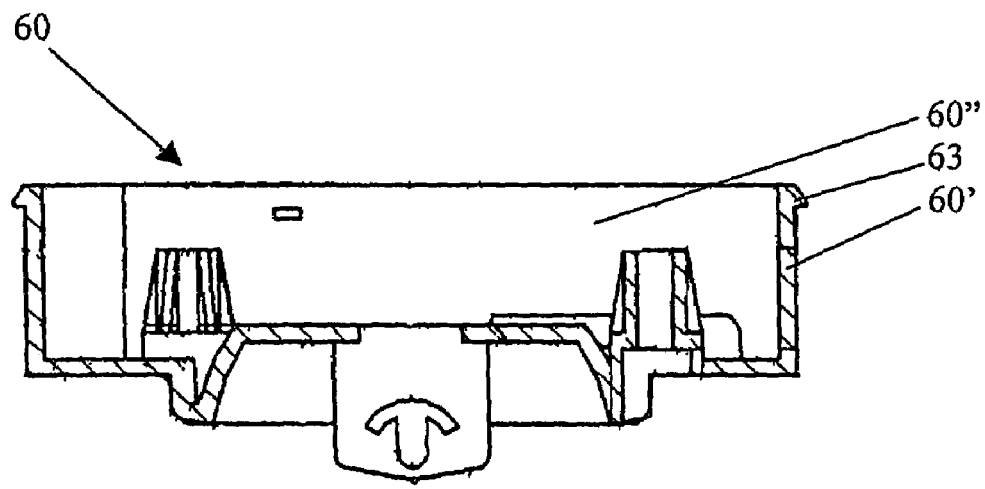
FIG. 12

OUTER REARVIEW MIRROR AND TILTING ASSEMBLY

The present specification refers to a patent for a utility model covering an actuating mechanism belonging to the field of the components of outer rear-view mirrors, and which has received an arrangement to provide better usage and manufacture conditions.

An actuating mechanism for the outer rear-view mirror is already known by essentially comprising: a pair of electric micro-engines provided with endless axes coaxial with their geometric axes, and arranged in respect of the mirror in order to move the mirror around its horizontal and vertical geometric axes; a pair of annular gears coupled with respective endless axes; two elastic grips incorporated into the gears; two threaded actuating pins; which pass through and couple with the grips and are axially movable by such grips; a casing which houses the engine and gear assembly, the ends of the actuating pins projecting outwards such casing, and placed in the inner face of the rear wall of the cover of the outer rear-view mirror assembly; a middle articulation assembly, the first portion of which being incorporated into the casing; a plate for supporting the mirror bracket whose rear face incorporates a pair of grooves with which the ends of the actuating pins are articulately coupled, and said supporting plate further featuring a second portion of the middle articulation assembly.

While such actuator meets its objective, studies have been made in order to improve it. The result of such studies is the present arrangement for the actuating mechanism.

Thus, usually such actuating mechanisms consist of a great number of parts, more specifically over twenty parts build the mechanism. In the present arrangement the mechanism consists of twelve parts only, what greatly simplifies its manufacture, and decreases its cost accordingly.

Generally, the electrical connections of the engines require welding and several kinds of arrangements to match the assembly with the number of connection possibilities of the different vehicle models. According to the present arrangement, the electric engines have their largest section dimensions arranged orthogonally to the bottom of the body and casing cover, with which the connection ends of such engines are at the side part of the actuating assembly casing, thus allowing wiring to be made by fitting (transfixed); such wires deriving from the casing being sufficient to receive as many types of connections as possible, according to the electric circuit of the receiving vehicle model.

According to the usual constructions, the elastic grips inside the gears show an annular configuration built by several sectors, and is compressed against the actuating pins by means of originally isolated springs, which are mounted outside around such grips. Such construction meets the requirements, but is relatively complex and makes mounting the assembly at the manufacturing line complicated. In order to overcome such problem, according to the present arrangement, bipartite and elastic annular structures are provided. Such construction is relatively simpler than the conventional and simplifies the mounting of the manufacturing line.

According to the conventional construction, the means for fastening a part of the casing to another essentially comprises rims provided with windows articulately incorporated into one of the casing parts, and corresponding bumpers incorporated into another part, and with which the windows of the respective articulated rims are coupled. This method of construction is relatively complex and requires similarly relatively complex molding tools. Further, the rims break up or lose their effects after a few opening and closing movements, which jeopardizes the assembly closure.

In order to overcome this disadvantage, the connection of the casing parts according to the present arrangement is made by means of openings provided in a portion and respective pins provided in the other, such openings and pins having geometries, which enable coupling and uncoupling without causing damages to the portions. Yet, such openings and pins are such that can be formed by means of the details of the relatively simple moulds, which require no drawers and other complex structures.

According to one embodiment possibility, the middle articulation of the mirror supporting plate in the casing provides a balance beam, whose middle point articulates to the casing and the ends support an articulated mirror supporting plate, all of that to provide a working similar to that of a universal joint. Pursuant to the conventional construction, mounting the balance beam in the casing, and particularly mounting the supporting plate in the balance beam are relatively complex operations, thus causing complications to the manufacturing line. In order to overcome such disadvantages, the device coupling the supporting plate to the balance beam comprises the supporting plate provided with a central, circular opening, where the balance beam is arranged, and provided with two diametrically opposite and turned to opposite directions C-shaped grooves, with which the respective ends of the balance beam fit. This form of configuration of the grooves allows for the balance beam ends to be arranged in front of the groove openings, and coupling to be simply made by making an angular movement with the balance beam around its cross-sectional axis.

Such improved constructive details of the present actuating mechanism end up by serving as the foundation for a mechanism whose construction and mounting are extremely simpler than those of the similar, conventional mechanism.

The attached drawings refer to the arrangement of the actuating mechanism, object of the present patent for utility model, in which:

FIG. 1 shows the actuating mechanism with its parts shown apart and in perspective;

FIG. 2 shows the actuating mechanism as mounted, seen in the plant from its supporting plate for the mirror bracket, where the balance beam is arranged;

FIG. 3 shows a S-S section indicated in the previous Figure;

FIG. 4 shows an enlarged detail of FIG. 3;

FIG. 5 shows a T-T section indicated in FIG. 2;

FIG. 6 shows a X-X section indicated in FIG. 2;

FIG. 7 shows a Y-Y section indicated in the previous FIGURE;

FIG. 10 shows a L-L section indicated in the previous FIGURE;

FIG. 11 shows a diametrical section of the casing body; and

Figure 8:
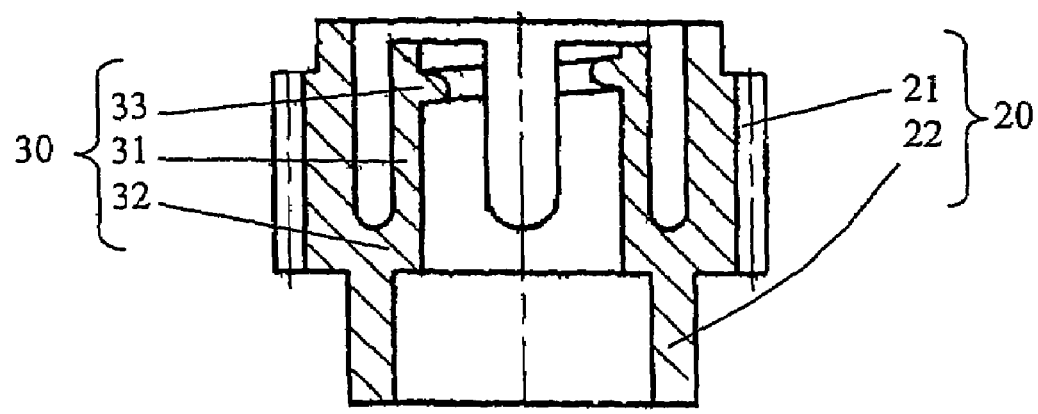
FIG. 8 shows a section of the gear.

FIG. 12 also shows a diametrical section of the casing cover.

According to what is shown in the above-mentioned FIGUREs, the actuating mechanism object of the present patent for utility model is intended to move the mirror bracket itself 1 of an outer rear-view assembly, and is essentially comprised (FIGS. 1 to 5) by: a pair of electric micro-engines 10 provided with endless axes 11 coaxial with the geometric axes, and arranged in respect of the mirror 1 in order to move it around its horizontal and vertical geometric axes; a pair of annular gears 20 coupled with the respective endless axes; two elastic grips 30 incorporated into the gears; two threaded actuating pins 4, which pass through and get coupled with the grips; a casing 50-60, which houses the engine and gear assembly from which the actuating pin ends project outwards, and which is placed in the inner face of the rear wall of the outer rear-view mirror assembly cover; a middle articulation assembly 70, a first portion of which being incorporated into the casing; a plate 80 for supporting the mirror bracket 1 whose rear face features a pair of grooves 81, where the ends of the actuating pins 40 are articulately coupled 40, and said supporting plate further featuring a second portion of the middle articulation assembly 70; said actuating pins 40 being axially movable when the engine(s) 10 is(are) driven and move the supporting plate 80 including the mirror 1, or said mirror bracket assembly 1 and supporting plate 80 can be moved by the direct manual action of the user, when the actuating pins 40 then exert force over the grips 30 to open and move them axially in respect thereof; the casing 50-60 is formed by the body 50 and cover 60 built by bottom 50', 60' and side walls 50", 60", respectively.

According to the present arrangement, the electric microengines 10 include a greater section, and another with a smaller dimension (FIGS. 6 and 7), the greater section being located in an orthogonal plan to the bottom walls 50' and 60' of the body 50 and cover 60 of the casing, in order to enable its electric wire terminals to be freely arranged next to the respective openings 51 (FIG. 1) of the side wall 50" of the body 50, thereby enabling the connection of electric wires 90 by fitting (transfixing). For such purpose, the body SO features in its bottom 50' two beds (FIG. 1) for receiving the electric engines, and such beds being built by concave bottom surfaces 52 aligned with equal concave surfaces 52' provided on the cover 60, said beds being further formed by end grips 53 and side rims 54, so that the electric engines 10 remain retained between the concave surfaces, 52, 52'; the end grips 53 and side rims 54. The referred to body 50 further features on its bottom portion 50', annular bearing rims 55 which work as a support for the gears 20; and three openings 56 arranged in a triangle-like formation, and receiving bolts for fastening the mechanism to the cover bottom of the rear-view mirror assembly.

The cover 60 has a peripheral wall 60" provided with openings 63 (FIG. 1) which get in line with the openings 51 of the peripheral wall 50" of the body 50, through which the wires 90 pass, and the bottom 60' of said cover 60 features bearing seats 64 for the gears 20 and three sleeves 65 aligned with the openings 56 of the body 50 for receiving the fastening bolts.

Each annular gear 20 (FIG. 8) is formed: by a gearing section whose outer surface is a toothed surface 21 coupled with the endless axis 11 of the electric engine 10; and by a supporting section 22, which is coupled with the annular bearing edge 55 of the body 50, where it can turn.

Each annular grip 30 (FIG. 8) is formed: by a bipartite annular and elastic body 31, arranged inside the opening gear 20 in a concentric way thereto, and one end thereof being located at the medium height level of the gear 20 where an edge 32 is provided for connecting the inner surface thereof to the elastic, annular, bipartite body 31, and the opposite end of said elastic, annular, bipartite body 31 being at the level of the gearing section end 21 of gear 20 where a helical baseboard 33 for gearing with the actuating pin 40 is provided.

Figure 9:
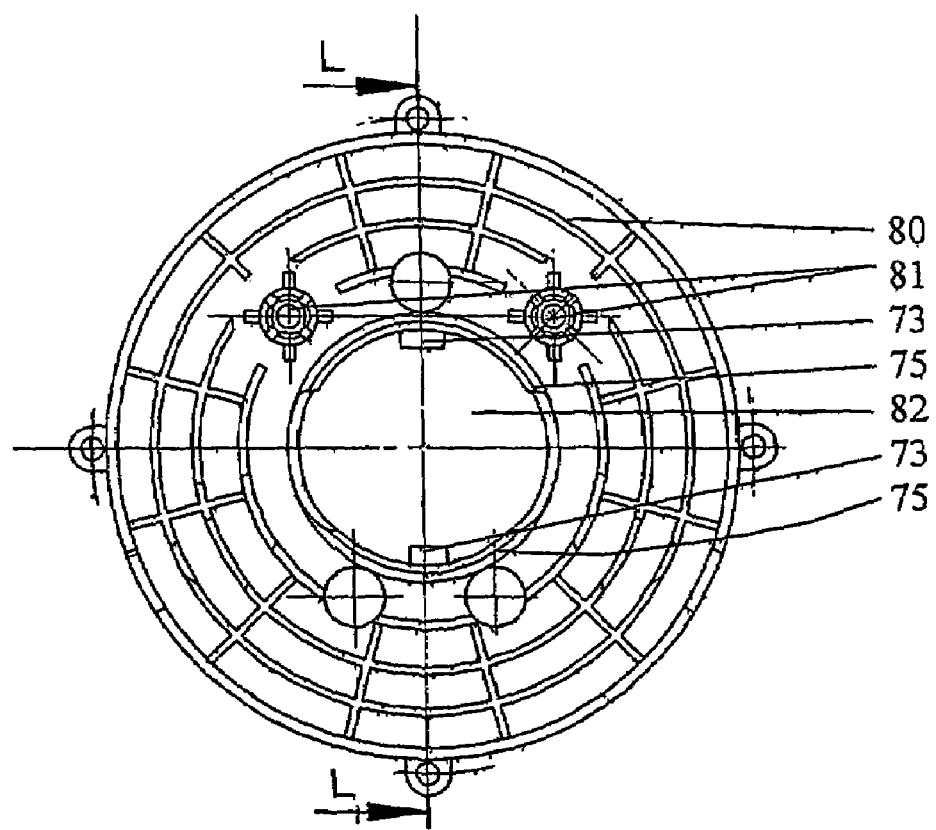
FIG. 9 shows in plant the supporting plate for the mirror bracket.

The middle articulation assembly 70 comprises, essentially: a balance beam 71 (FIGS. 1, 2, 5) whose medium point is articulately coupled with a groove 72 (FIG. 3) provided on the bottom outer surface 60' of cover 60, and the ends of said balance beam 71 being coupled with two respective grooves 73 (FIGS. 5, 9); provided at a point diametrically opposite to the central height 82 of the mirror supporting plate 1; said outer surface of the bottom 60' of cover 60 and opening 82 of the supporting plate 80 are provided with intercoupled spherical segment surfaces 74 and 75 (FIG. 4), which complete the middle articulation 70.

In the present arrangement, the grooves 73, receiving the balance beam ends 71 are "C"-shaped (FIGS. 1, 9, 10), and their concavities are turned to opposite directions one to the other, the ends 76 of the balance beam 71 are cylindrical and can forcedly pass through the free ends of said "C"-shaped grooves 73. With that, the balance beam 71 can be mounted in the "C"-shaped grooves 73 by arranging their ends 76 in front of the openings of the referred to "C"-shaped grooves, and next a small turn can be applied to the balance beam 71 around the cross-sectional geometric 20 axis, so that their ends 76 forcedly pass through the openings of the "C"-shaped grooves 73. This mounting approach facilitates very much the process for mounting the manufacturing line of the actuator.

In the present arrangement, the device for fastening the body 50 and the cover 60 comprises, essentially: at least three openings 57 (FIG. 1, 5, 11) provided in the corners between the bottom 50' and the peripheral wall 50" of the body 50, and means of corresponding cuneiform, turned outwards projections 63 (FIGS. 1, 5, 12) provided in the end of the peripheral wall 60" of cover 60. The mentioned openings 57 are such that can be made without the need of drawers in the cover shaping moulds. For such purpose, such openings are formed by outer cut-offs in the peripheral wall 50" from the ridge in respect of the bottom 50', such cut-offs being extended up to next the free edge of said peripheral wall 50".

The endless axes 11; the gears and the elastic grips 20-30; the actuating pins 40; the body 50 and the cover 60 of the casing; the balance beam 71, and the supporting plate 80 are made of a thermoplastic material conveniently shaped.

According to the above-described primary construction, the actuating mechanism object of the present patent for utility model can include changes either related with materials, dimensions, constructive details and/or functional configuration, without departing from the scope of the protection claimed.

The invention claimed is:

1. An arrangement for an actuating mechanism, comprising: a pair of electric micro-engines (10) provided with endless axes (11); a pair of annular gears (20) coupled with the respective endless axes; two elastic grips (30) incorporated into the gears; two threaded actuating pins (40), which pass through and remain coupled with the grips; a casing (50)-(60), which houses the engine and gear assembly, from which the ends of the actuating pins project outwards; a middle articulation assembly (70) a, first portion of which being incorporated into the body (50) of the casing; a plate (80) for supporting the mirror bracket (1) whose rear face features a pair of grooves (81), where the ends of the actuating pins articulately couple with (40); said supporting plate (80) being further formed by a middle opening (82), and featuring a second portion of the middle articulation assembly (70); said articulation assembly (70) being further formed by a balance bean (71) articulately coupled with the mentioned first and second portions of the articulation assembly (70); said electric micro-engines (10) featuring sections among which one shows a larger dimension, and the other shows a smaller dimension, characterized in that the larger sections of the electric engines (10) are orthogonal to the bottom walls (50)' and (60)' of the body (50) and cover (60) of the casing, so their electric connection terminals are freely arranged next to their respective openings (51) of the side wall (50)" of the body (50), thus enabling the electric wiring connection (90) by fitting (transfixing); each annular grip (30) is formed by: a bipartite and elastic annular body (31), arranged inside the gear opening (20), concentric thereto and an end of which is at the medium height level of the gear (20), where a rim (32) is arranged for the connection of its inner surface with the bipartite, elastic, annular body (31), and the opposite end of said bipartite, elastic, annular body (31) is at the end level of the gear gearing section (20), where a helical rib (33) is provided for gearing with the actuating pin (40); grooves (73), incorporated into the opening (82) of the supporting plate (80) receiving the ends of the balance beam (71) are C-shaped grooves, placed with their concavities turned to opposite directions to each other, and the ends (76) of the balance beam (71) are cylindrical and can forcedly pass through the free ends of said C-shaped grooves (73), by means of the arrangement of said cylindrical ends (76) in front of the openings of the C-shaped grooves (73), and an angular movement in the balance beam (71) around its cross-sectional geometric axis towards the ends (76) to get into the C-shaped grooves (73); the device for fastening the body (50) and the cover (60) of the casing essentially comprises of: at least three openings (57) provided in the corners between the bottom (50)' and the peripheral wall (50)" of the body (50), and corresponding cuneiform, turned outward projections (63) provided at the end of the peripheral wall (60)" of the cover (60); referred to openings (57) being formed by outer cut-offs on the peripheral wall (50)" of the body (50) of the casing from its ridge in respect of the bottom (50)', and even next to the free edge of said peripheral wall (50)".

2. The arrangement for an actuating mechanism, as claimed in claim 1, characterized in that the body (50) features in its bottom part (50)' two beds for receiving the electric engines formed by concave bottom surfaces (52), which get in line with equal concave surfaces (52)' provided on the cover (69), the referred to beds being further formed by end grips (53) and side rims (54) so that the electric engines (10) are retained between the concave surfaces (52), (52)'; the outer grips (53) and side rims (54); said body (50) further featuring in its bottom portion (50)' annular bearing rims (55) for supporting the gears (20); and three openings (56) arranged in a triangle-like configuration, and receiving bolts for fastening the mechanism to the bottom of the rear-view mirror assembly coat.

3. The arrangement for an actuating mechanism, as claimed in claim 1, characterized in that the cover (60) has a peripheral wall (60)" provided with openings (63) aligned with the openings (51) of the peripheral wall (50)" of the body (50) for passing the wires (90) and the bottom (60)' of said cover (60) including beds (64) for supporting the gears (20) and incorporating three sleeves (65) in line with the openings (56) of the body (50) for receiving the fastening bolts.

* * * * *